United States Patent

[11] 3,572,758

| [72] | Inventor | Robert E. Lee<br>312 Eanes Road, Austin, Tex. 78746 |
|------|----------|---|
| [21] | Appl. No. | 799,054 |
| [22] | Filed | Feb. 13, 1969 |
| [45] | Patented | Mar. 30, 1971 |

[54] COMBINATION BICYCLE LUGGAGE CARRIER AND BICYCLE EXERCISE STAND
7 Claims, 8 Drawing Figs.

[52] U.S. Cl. .................................................. 280/296, 224/31, 272/73
[51] Int. Cl. ................................................. B62h 1/04
[50] Field of Search .......................................... 280/293, 295, 297, 296, 302, 202; 224/31, 32, 39; 272/73

[56] References Cited
UNITED STATES PATENTS

| 581,550 | 4/1897 | Goldsmith ................... | 280/295X |
| 2,972,478 | 2/1961 | Raines ........................ | 280/293X |
| 3,352,426 | 11/1967 | Carlson ....................... | 272/73X |

FOREIGN PATENTS

| 239,698 | 9/1925 | Great Britain ............... | 280/295 |
| 37,348 | 1/1936 | Netherlands ................. | 224/32 |
| 156,199 | 1/1938 | Austria ........................ | 224/31 |
| 429,746 | 3/1948 | Italy ............................ | 224/31 |

*Primary Examiner*—Kenneth H. Betts
*Attorney*—Marion E. Shafer

ABSTRACT: A multipurpose device for use in connection with a bicycle, said device being adapted for use in one of its positions as a bicycle luggage carrier and rotatable to a second position where it may serve as a bicycle stand to convert the bicycle into a physical-exerciser device.

ROBERT E. LEE,
INVENTOR.

BY M. E. Shafer,
ATTORNEY.

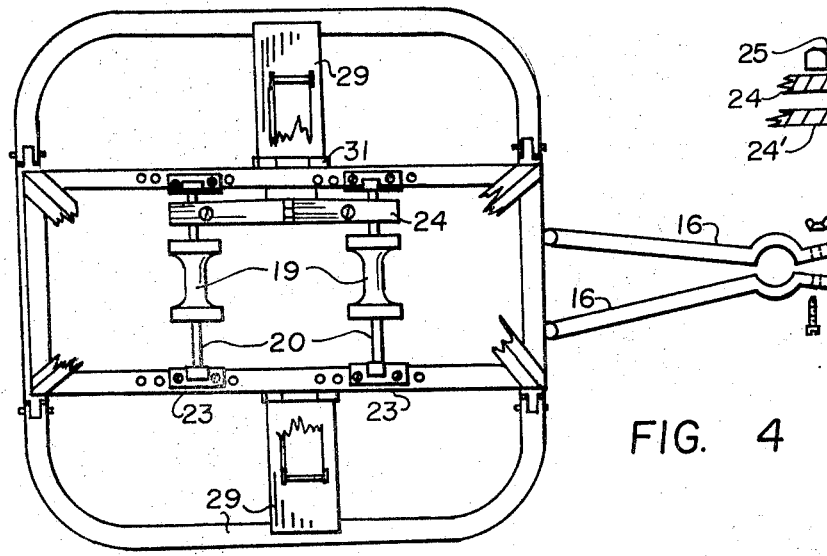
FIG. 4
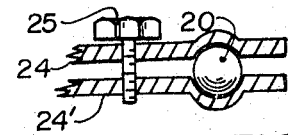
FIG. 5
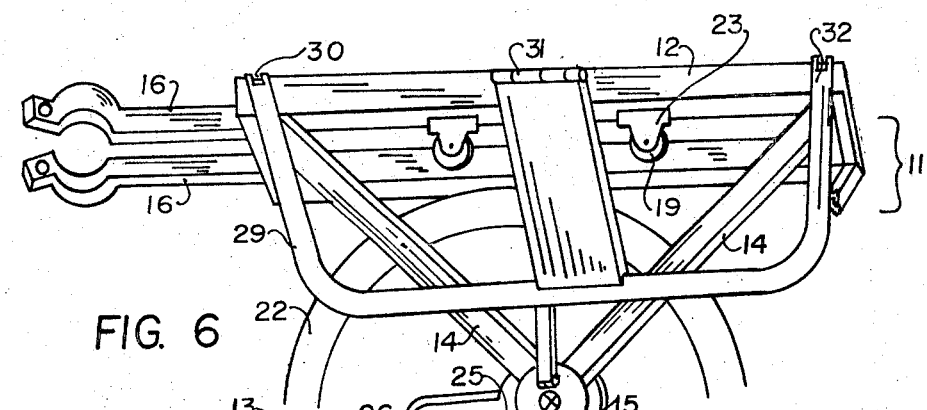
FIG. 6
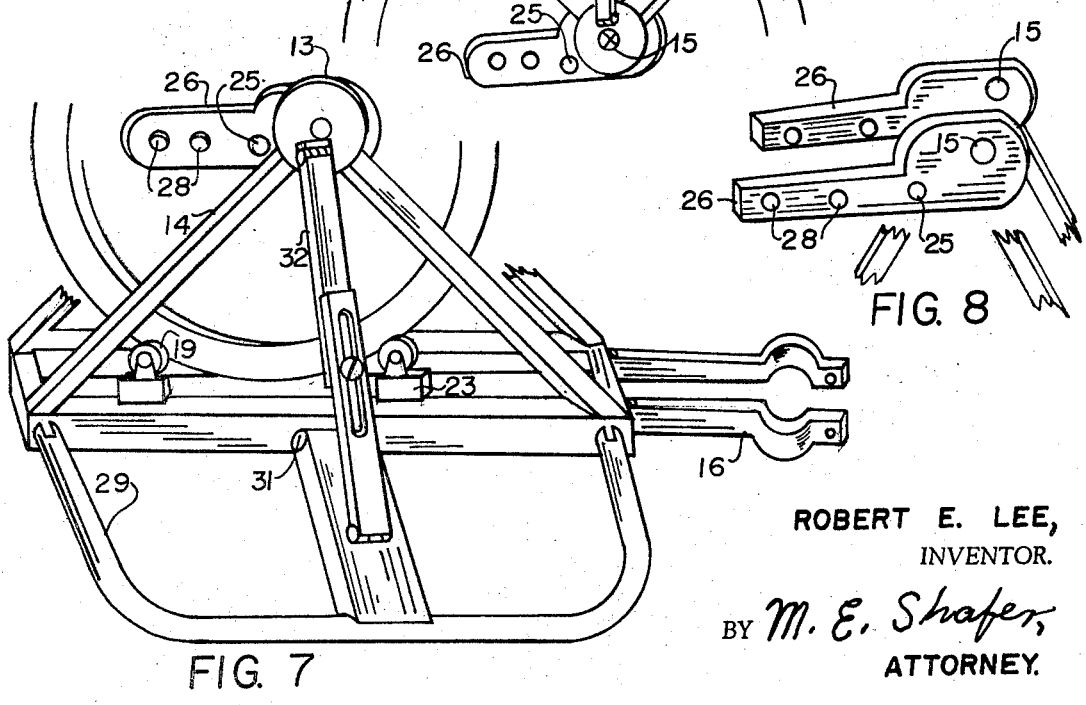
FIG. 7
FIG. 8
ROBERT E. LEE,
INVENTOR.
BY *M. E. Shafer,*
ATTORNEY.

COMBINATION BICYCLE LUGGAGE CARRIER AND BICYCLE EXERCISE STAND

This invention relates to improvements in attachable accessories for use in connection with bicycles and more particularly it relates to an improved bicycle luggage carrier which may be rotated into a second position to serve as a bicycle stand and as a means of converting the bicycle into an exercise device.

DESCRIPTION OF THE PRIOR ART

Bicycle luggage carriers have existed in the arts almost since the beginning of the bicycle itself but bicycle luggage carriers so far have been just that, luggage carriers, and nothing more. There is also an abundance of bicycle stands and auxiliary bicycle apparatus designed to convert the bicycle into a stationary exercise device but such devices in the past have tended to be a permanent part of the bicycle structure to a stationary exerciser only or the attachable-removable bicycle stands tended to be very large and bulky requiring detachment and storage when the bicycle was to be used out of doors. These attachable-removable bicycle exercise stands also usually involved some amount of mechanical complexity in attaching or removing the bicycle from the stand creating further inconvenience problems in converting the bicycle from an outdoor travel vehicle into an indoor or stationary exercise device or vice versa. Commercially developed and available bicycle exercise devices have therefore tended to be almost altogether permanent exercise devices in the partial shape of a bicycle but not readily convertible into a vehicle and therefore have been useful to only those persons having spacious homes or gymnasiums in which a permanent exerciser of such physical dimensions could be conveniently stored. The proposal of bringing a vehicle bicycle indoors and converting it into a temporary physical exerciser by attaching or mounting it on some kind of special stand and attachment apparatus have been numerous but almost all have remained just paper dreams.

OBJECTS

It is therefore a primary object of this invention to create a combination bicycle luggage carrier and physical-exercise device which can be used as a luggage carrier when the bicycle is in use out doors as a vehicle and can be readily converted into a bicycle stand and physical-exerciser device when the user wants to use the bicycle indoors or wants to secure his exercise at a stationary location.

Another object of the invention is to create a bicycle exercise stand that can remain permanently attached to and be a part of the bicycle even when the bicycle is used as an outdoor vehicle thereby eliminating the necessity of connecting and disconnecting the bicycle exercise stand each time the bicycle is to be used as an exerciser and also eliminating the necessity of providing for storage for said bicycle exercise stand when the bicycle is taken outside for use as a vehicle.

A further object of the invention is to provide convertible attachment apparatus that will provide easier, convenient and therefore more practical conversion of the bicycle from an outdoor vehicle and exercise device to an indoor stationery exerciser and back into a conventional bicycle vehicle for outdoor storage with minimum inconvenience to the user.

Still another object of this invention is to provide such a combination interconvertible bicycle luggage carrier and bicycle exercise stand that will require no extra or loose parts in converting from one use to another.

A still further objective of this invention is to provide such a combination interconvertible bicycle luggage carrier and bicycle exercise stand that will be of such simple unitary construction that it can be built as an integral part of new bicycles or can be marketed as an attachable accessory for use with presently existing conventional bicycles.

Other objects and advantages of this invention will become apparent to consideration of the following description and appended claims in conjunction with the attached drawings.

DESCRIPTION OF THE SEVERAL VIEWS OF THE DRAWINGS

FIG. 4 is a planned view of the underside of the luggage carrier platform showing left and right flap frames hingedly attached to said platform unfolded into extended position as they would be if they were being used as auxiliary brace supports for the bicycle stand when the device is used as an exerciser.

FIG. 5 is a cross section view of one means of friction adjustment for the friction rollers.

FIG. 6 is a perspective view of the device in luggage rack position showing the left and right flap frames folded down as they would be when the device is being used as a luggage carrier.

FIG. 7 is a partial perspective view of one side of the device when rotated into use as a bicycle exercise stand showing how off center pivoting permits the friction rollers to come into contact with the rear wheel of the bicycle when the device is employed as an exercise device and showing the folding braces that assist in holding the bicycle in upright position while employed as a bicycle exercise machine.

FIG. 8 is a perspective view of the left and right auxiliary pivot strap plate showing how off center positioning of the pivot bearing permits the device described herein to be rotated from a down position of bicycle exercise stand in which the friction rollers are in contact with the rear bicycle wheel while when the device is rotated into the alternate position as a luggage carrier the friction rollers are disengaged from contact with said rear bicycle wheel as said alternate positions are illustrated in FIGS. 6 and 7.

Figure 1:
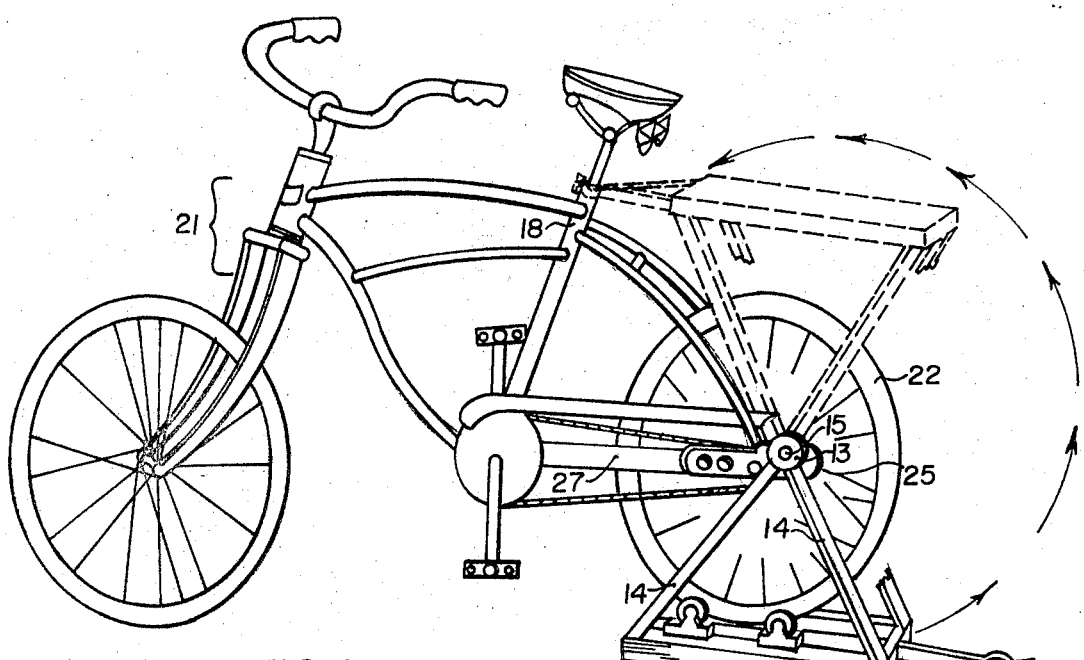
FIG. 1 is a perspective view of a standard bicycle with a preferred embodiment of the invention described herein attached to the rear wheel of said bicycle. The invention is shown rotated into its down position where it serves as a bicycle stand but note the dashed outline of an alternate up position of the device for use as a bicycle luggage rack.

In describing one selected form or preferred embodiment of this invention as shown in the drawings and described in this specification, specific terms and components are used for clarity. However, it is not intended to limit the claimed invention to the specific form, components or construction shown and it is to be understood that the specific terms used in this illustration of the invention are intended to include all technical equivalents which operate in a similar manner to accomplish a similar purpose.

DETAILED DESCRIPTION OF PREFERRED EMBODIMENT OF THE INVENTION

Figure 3:
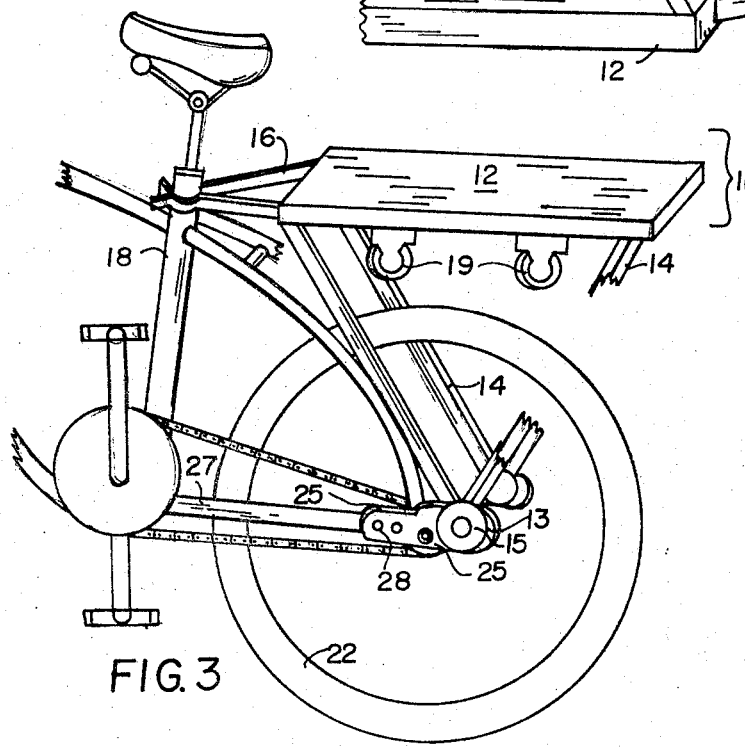
FIG. 3 is a partial perspective view of the device contemplated by this invention in its up position for use as a bicycle luggage carrier showing the means by which the fork clamp arms are clamped to or around the seat post of the bicycle to secure the device in position for use as a bicycle luggage carrier.

Referring to the specific embodiment of the invention selected for illustration in the accompanying drawings, the No. 21 refers to the bicycle generally which can be any commercially available bicycle to which the invention described herein could be attached or could be a bicycle with the combination luggage rack and bicycle exercise stand fabricated into the bicycle at the time of manufacture. Turning to the new part of the device described herein number 11 refers to the overall new part of the device constituting this invention, that is the combination bicycle luggage carrier and bicycle exercise stand. Perspective views of the device used as a luggage carrier are illustrated in FIG. 3 and FIG. 11. The device in its alternate position as a bicycle exerciser stand is illustrated in FIG. 1 and FIG. 7. The flat surface of the luggage rack, rack-base platform 12 is adapted to be horizontally positioned above the rear wheel of a bicycle when used as a bicycle luggage carrier rack or alternately to be positioned horizontally below the rear wheel of the bicycle when employed as a bicycle exercise stand and may be constructed as a solid platform or fabricated in an appropriate metal framework. Said rack-base platform 12 is pivotally mounted by means of left and right pairs of rack-base support frame members 14-14-14-14 which are pivotally mounted and supported from auxiliary pivot bearings 15. The other end of support frame members 14-14-14-14 may be attached to the 4 corners of rack-base platform 12 by any appropriate means.

In the inventor's homemade test prototype of the invention support braces 14-14 and 14-14 together with the support braces for the fold down side flaps, hereinafter described were attached to pivot plate 13. This means of providing for pivotal mounting of said support braces was crude and the manufacturer of a commercial product can probably eliminate pivot plate 13 and still provide pivotal mounting of said braces. Plate 13 should therefore be regarded as an illustration of a possible means of providing for such pivotal mounting and not as a necessary element of the invention.

When rack-base platform 12 is positioned above the rear wheel for use as a luggage platform the device is secured in position by means of fork clamp arms 16-16 which extend forward from luggage rack platform 12 to engage and be secured to seat post 18 of the bicycle. In the case of the homemade prototype of this invention said fork clamp arms 16-16 were secured to seat post 18 by means of a simple bolt and thumb-nut 17 and 17'. The manufacturer of a more sophisticated device for marketing may well prefer to employ means other than fork clamps 16-16 and screw and thumbnut 17-17' to secure luggage rack platform 12 to seat post 18 of the bicycle. Practically all bicycle luggage carriers are secured to the seat post of the bicycle by means of appropriate clamps or attachments and the substitution of any reasonably appropriate means of attachably and detachably securing said luggage carrier rack platform 12 to seat post 18 of the bicycle are within the reasonable contemplation of this invention.

When rack-base platform 12 is rotated into its alternate or down position as illustrated in FIG. 1 and FIG. 7 of the drawings herein stand platform 12 comes to rest on the ground and provides a means of support for the rear wheel 22 and the rear end of the bicycle 21. Since rack-base support 14-14 and 14-14 are pivoted from auxiliary pivot bearings 15-15 which are offcenter being positioned slightly above and to the rear of the axle of the rear wheel 22 of the bicycle, the distance between rack base platform 12 and rear wheel 22 is diminished as the device is rotated into its downward position so that bicycle rear wheel 22 comes in contact with and rides on friction rollers 19-19 which are mounted and so positioned on the bottom surface of rack-base platform 12 as to engage bicycle rear wheel 22 and to provide a friction drag to the rotation of the rear wheel when the bicycle and exercise stand is to be used as an exerciser. Friction rollers 19-19 are mounted on axle 20-20 which ride in bearings 23-23 and 23-23. In order to provide adjustable control of the amount of the drag provided by friction rollers 19-19 to bicycle wheel 22 the inventor in his test prototype employed a crude homemade braking mechanism composed of brake straps 24 and 24' which clamped on either side of and around axle 20 and were adjusted by means of friction clamp adjustment screw 25. Again it will be readily apparent from any cursory examination of bicycle exercise machines on the present commercial market or of proposed bicycle exercise machines available in the existing patent art that there are a variety of ways of applying friction drag to the rear wheel of such a bicycle exercise machine and numerous breaking mechanisms for applying adjustable braking pressure to the friction cushions of such apparatus. The inventor claims nothing particularly unique in the choice of friction rollers, means of mounting said friction rollers, or in the braking means employed in the test prototype of said invention as described and illustrated herein. The manufacturer of a commercial product for market could very well employ equivalent friction applying devices and more convenient and easier to operate brake adjustment means without departing from the spirit of this invention. The means of engaging and disengaging friction rollers 19-19 from contact with bicycle wheel 22 by rotating platform-stand 12 from an offcenter pivot point 15 through so that said rollers 19-19 are engaged when the stand is in down position and the rollers are disengaged from contact with bicycle wheel 22 when platform 12 is rotated to its up or luggage rack position is regarded as new to the art of devising a combination bicycle luggage rack and exercise stand.

Since offcenter pivot point 15 must be located a small distance away from axle 25 of bicycle wheel 22 at a point where there is normally no structure on most bicycles special pivoting means must be provided. This has been accomplished by devising left and right auxiliary pivot strap plates 26-26. Said auxiliary pivot straps plates may be attached to rear axle frame support members 27-27 by fasteners 28-28. In the case of the inventor's test prototype said strap plates 26-26 were simply bolted to bicycle frame members 27-27 but said plates could be attached by any conventional means. In the case of manufacture of a new bicycle said plates 26-26 could be cast or fabricated as an integral part of bicycle frame member 27-27. The general shape of auxiliary pivot strap plates 26-26 is illustrated in FIG. 8 of the drawings herein but the relative positioning of axle pivot point 25 and auxiliary pivot bearings 15 are exaggerated in the drawings for the sake of clarity and to clearly indicate that auxiliary pivot bearings 15 are positioned above and to the rear of axle pivot point 25 for the rear wheels of the bicycle.

Figure 2:
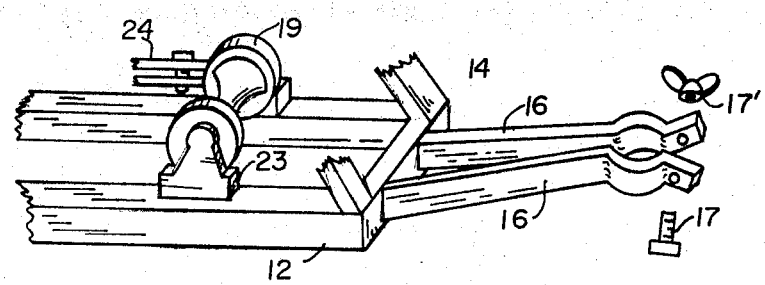
FIG. 2 is a sectional perspective view of the forward part of the platform frame showing one of the friction rollers that engage the wheel when the device is used as an exercise stand and showing the details of the forked clamp which holds the device in up position when it is used as a luggage carrier.

The structure described to this point as illustrated in FIGS. 1, 2 and 3 constitutes a complete combination bicycle luggage rack and bicycle exercise stand which will be sufficient to hold the bicycle in upright position when used as a bicycle stand provided platform 12 is made sufficiently wide. The inventor's test prototype, however, disclosed certain difficulties. Persons likely to use the bicycle and bicycle stand as an exercise device are also likely to be persons possessed of more than average avoirdupois and to have a poor sense of balancing, especially on a stationary bicycle. The result was that a fairly wide bicycle stand platform 12 had to be employed to enable the bicycle to stand in upright position while being pedalled by a fairly stout person. If bicycle stand platform 12 is made very much wider than the customary seat of the bicycle the bicycle stand begins to look wide and awkward when employed as a luggage rack and could possibly be an obstruction in traffic. If said platform 12 is to be scaled down to the customary width of a conventional bicycle luggage rack then persons using the device as a bicycle exercise stand will have to be very careful about preserving their balance or some auxiliary means will have to be provided for bracing the bicycle from each side.

If the manufacturer of the proposed combination bicycle luggage rack and bicycle exercise stand insists upon making platform 12 fairly narrow in order to preserve the appearance of a conventional luggage rack then additional stability can be provided when the device is used as a bicycle exercise stand by providing left and right fold down flap frames 29-29 which are hingedly attached to the sides of the bicycle luggage rack platform 12 by means of hinges 30, 31, and 32. Said flap frame could be fabricated from solid panels and given the appearance of fender skirts and fabricated from any convenient material, or said side flap frame 29 could be fabricated from metal in the form of a metal frame as illustrated in FIGS. 4, 6 and 7.

FIG. 7 shows how flap frames 29 and 29 may be folded out flat on the floor to extend the effective width of platform 12 when the device is being used as an exercise stand. Any bracing means by which said left and right flap frames 19 and 29 are held in extended position from bicycle stand platform 12 while the bicycle is being used as an exercise device will improve the stability of the bicycle exerciser. The specific means of bracing or securing said side flap frames in extended position are not critical. In the case of the inventor's prototype, an adjustable and folding brace 32 was used to provide the bicycle with lateral stability when used as an exercise stand and device. The makeshift brace 32 as illustrated in the drawings herein was awkward and required considerable hand manipulation to adjust. The particular means of bracing flap frames 29 and 29 are not regarded as critical and no novelty is claimed for this particular means of bracing. The manufacturer of a commercial combination bicycle luggage rack and bicycle exercise stand would be expected to provide a more suitable form of folding brace which would work more compactly and more efficiently. This invention therefore simply contemplates the provision of a suitable means of bracing flap frame 29 and 29 with a suitable folding brace that can hold said flap frames in extended position when the device is being used as a bicycle exerciser and which can be folded out of the way when bicycle side flap frames 29 and 29 are dropped down on either side of bicycle rear wheel 22 when the device is to be used as a bicycle luggage carrier. An illustration of the bicycle luggage carrier with side flap frames 29 and 29 in folded down position, as they would be when the device is being used as a luggage carrier, is illustrated in FIG. 6 of the drawings.

OPERATION

As previously described bicycle luggage rack platform 12 is supported by 4 braces 14-14-14-14 which are pivotally supported and mounted from auxiliary pivot bearings 15 and left and right auxiliary pivot strap plates 26-26 so that said structure is mounted offcenter with respect to the rear wheel of bicycle 21. When the device is to be used as a bicycle luggage rack it is simply rotated into its upper position so that platform 12 is parallel to the ground and above bicycle wheel 22. At this time fork clamp arms 16-16 have been pushed so far forward that the collar portion of said fork clamp arms snap around bicycle seat post 18. The bicycle rack may be secured in this position by means of a bolt and thumbnut 17 and 17' or any suitable means of locking fork clamp arms to bicycle seat post 18. The structure is then used in the same manner as any conventional bicycle luggage rack.

When the bicycle is to be used as a stationary exercise device the combination bicycle luggage carrier and exercise rack is rotated downward until platform 12 is brought to rest on the ground as shown in FIG. 1 and FIG. 7. Since pivot point 15 on left and right auxiliary pivot strap plates 26-26 are offcenter with respect to bicycle wheel 22, friction rollers 19-19 which did not touch bicycle wheel 22 when platform 12 was in its upper position as a bicycle luggage rack are brought into contact with bicycle wheel 22 as the device is rotated into its lower position to be used as a bicycle exercise stand. It will be readily apparent from examination of the drawings herein that a would be exerciser could at this point mount the bicycle and operate the foot pedals in much the same manner as if he were riding the bicycle. In this instance, however, the bicycle would not move forward since rear wheel 22 would be removed from contact from the ground or floor. Thus the person operating the bicycle pedals would secure the benefits of exercise involved in riding or peddling a bicycle but there would be no necessity of riding the bicycle over an open or outside distance. The amount of exercise that the rider would secure in these circumstances would depend upon the amount of friction or drag provided by friction rollers 19-19. The device is therefore provided with adjustable brake straps 24-24' or a suitable adjustable braking mechanism which would permit the operator to adjust the amount of friction drag provided by friction rollers 19-19 to his own personal requirements.

Where the person using the bicycle exercise stand is exceptionally heavy and bicycle exercise stand platform 12 has been made fairly narrow in order to preserve the lines and appearance of a conventional bicycle luggage carrier then bicycle side flap frames 29-29 may be folded outward to lie flat against the floor or ground to provide additional lateral support to assist in holding the bicycle in upright position while being used as a bicycle exercise device. In the event that such auxiliary left and right flap frames are used to provide additional support and stability for the bicycle when used as an exercise device said left and right folding flap frames 29-29 will need to be secured in extended position. This may be done by sliding bars or lock mechanisms that lock said frames in their unfolded positions or it may be done by means of a folding brace such as brace 32 which connects between an appropriate point on side frames 29-29 and an upright portion of the bicycle such as pivot plate 13. Said means of locking or bracing side folding frames 29-29 in extended position will need to be released when the device is to be used again as a bicycle luggage carrier. At such time said securing means should be released or folding brace 32 should be released and folded into position so that side flap frames 29-29 can be folded down on either side of the bicycle as the device is rotated into its upper position to again serve as a bicycle luggage carrier.

ADVANTAGES

In the foregoing description of the structure and the operation of the invention as set forth herein a number of advantages have been claimed for the apparatus and others will be readily apparent to persons skilled in the art. In summary the principle advantage of this combination bicycle luggage rack and bicycle exercise stand is that for the first time it permits a physical exerciser to use his bicycle out of doors on sunny days in the conventional manner and still also allows him on rainy days or at night to bring the bicycle in doors and to set it up as a temporary fixed position exercise device without having to attach or remove auxiliary equipment.

A variety of bicycle exercise stands have been proposed and built in the past but they have either permanently immobilized the bicycle from use as a conventional bicycle or they have been attachable-removable devices that had to be removed and stored somewhere while the bicycle was being used in a conventional manner. This invention contemplates a combination bicycle luggage rack and exercise stand that can remain a permanent part of the bicycle instead and therefore will not require separate storage of the stand and the bicycle.

Although this specification described but a single embodiment of the invention with certain applications thereof, it should be understood that structural or material rearrangements of adequate or equivalent parts, substitutions of equivalent functional elements and other modifications in structure can be made and other applications devised without departing from the spirit and scope of my invention. I, therefore, desire that the description and drawings herein be regarded as only an illustration of my invention and that the invention be regarded as limited only as set forth in the following claims, or as required by the prior art.

I claim:

1. A combination bicycle luggage carrier and bicycle exercise stand and exercise machine apparatus to be attached to and used with a bicycle, said combination comprising:

A. a pair of auxiliary pivot strap plates with each of said plates having;
  1. means for securing said plates to the rear axle frame support members of a bicycle;
  2. openings to permit the rear axle of the bicycle to pass through said openings in said strap plates; and
  3. offcenter auxiliary pivot bearings just above and to the rear of the openings provided for the rear axle of the bicycle;

B. a horizontally positioned rack-base;

C. pivotally mounted rack-base support frame members
  1. pivotally connected to the auxiliary pivot bearings in the strap plates; and
  2. connected to the four corners of the rack-base;

D. means for rotating said luggage rack-base platform from a first position above the rear wheel of the associated bicycle to a second position below the rear wheel of the associated bicycle to form a bicycle support stand when the bicycle and device are used as an exercise machine;

E. means of securing said rack-base platform in its first position when the device is to be used as a luggage carrier;

F. left and right flap frames;

G. hinge means connecting one side of each of said flap frames to each side of the rack-base such that said flap frames hang down on the left and right sides of the bicycle when the device is being used as a luggage carrier and to fold out flat to extend the size of the device and provide bracing support T to the bicycle when the bicycle and this invention is being used as a bicycle exercise machine; and H. folding braces adapted to hold said flap frames in extended position when the device is serving as a bicycle exercise machine;

I. means for securing said rack-base to the seat post of a bicycle when the device is being used as a bicycle luggage carrier;

J. a plurality of friction rollers;
  1. mounted on the under side of rack-base;
  2. positioned to engage with the rear wheel of the bicycle when the rack-base is rotated to the down position to serve as a bicycle stand; and K. braking means acting on said rollers to control the amount of friction applied to the rear wheel of the bicycle when the bicycle and device are used as an exercise machine.

2. An improved multipurpose bicycle having a combination luggage carrier and bicycle exercise stand with associated apparatus for converting said bicycle into an exercising machine, said improved bicycle comprising:

A. a bicycle;

B. a pair of auxiliary pivot strap plates with each of said plates having;
  1. means for securing said plates to the rear axle frame support members of a bicycle;
  2. openings to permit the rear axle of the bicycle to pass through said openings in said strap plates;
  3. offcenter auxiliary pivot bearings just above and to the rear of the openings provided for the rear axle of the bicycle;

C. a horizontally positioned rack-base platform;

D. pivotally mounted rack-base support frame members;
  1. pivotally connected to the auxiliary pivot bearings in the strap plates; and
  2. connected to the four corners of the rack-base;

E. means for rotating said luggage rack-base platform from a first position above the rear wheel of the associated bicycle to a second position below the rear wheel of the associated bicycle to form a bicycle support stand when the bicycle and device are used as an exercise machine;

F. means of securing said rack-base platform in its first position when the device is to be used as a luggage carrier;

G. a plurality of rollers;
  1. mounted on the under side of the rack-base; and
  2. positioned to engage with the rear wheel of the bicycle when the rack-base is rotated to the down position to serve as a bicycle exercise machine; and H. braking means acting on said rollers to control the amount of friction applied to the rear wheel of the bicycle when the bicycle and device are used as an exercise machine.

3. The improved bicycle with combination luggage carrier and bicycle exercise apparatus described in claim 2 together with:

A. left and right flap support frames;

B. hinge means connecting one side of each of said flap frames to the left and right sides of said rack-base platform such that said flap frames hang down out of the way on the left and right sides of the bicycle when the device is being used as a luggage carrier and fold out flat to extend the size of the device and provide supportive bracing when the device is being used as an exercise machine; and C. folding braces extending between the outer edge of said flap frames and the auxiliary pivot strap plates to hold said flap frames in extended position and provide greater support when the device is being used as an exercise machine, 4. A combination bicycle and luggage carrier and bicycle stand to be attached to and used with a bicycle, said combination comprising:

A. a pair of auxiliary pivot straps adapted for attachment to the rear axle frame support members of a bicycle and provided with auxiliary pivot bearings located just above and to the rear of the rear axle of the bicycle;

B. a luggage rack-base platform mounted on support frame members;

C. means for rotating said luggage rack-base platform from a first position above the rear wheel of the associated bicycle to a second position below the rear wheel of the associated bicycle to form a bicycle stand;

D. means of securing said rack-base platform in its first position when the device is to be used as a luggage carrier;

E. left and right flap frames;

F. means of attaching said flap frames to each side of the luggage carrier platform to extend the size of the device when used as a bicycle stand; and G. folding braces between said flap frame positioned to secure the bicycle in upright position with respect to the bicycle stand.

5. A combination bicycle luggage carrier and bicycle exercise machine to be attached to and used with a bicycle with the exercise machine apparatus attached to, stored and carried as part of the bicycle even when the bicycle is used as a vehicle, said combination comprising:

A. a pair of auxiliary pivot strap plates with each of said plates having;
  1. means for securing said plates to the rear axle frame support members of a bicycle; and
  2. offcenter auxiliary pivot bearings just above and to the rear of the rear axle of the bicycle;

B. a horizontally positioned luggage carrier rack-base;

C. pivotally mounted rack-base support frame members connnected to the auxiliary pivot bearings in the strap plates; and
  1. arranged to support the rack-base platform;

D. means for rotating said luggage carrier rack-base platform from a first position above the rear wheel of the associated bicycle to a second position below the rear wheel of the associated bicycle when the bicycle and device are being used as an exercise machine;

E. means of securing said rack-base platform in its first position when the device is to be used as a luggage carrier; and F. exercise machine apparatus including a plurality of friction rollers mounted on the under side of said rack-base platform in such position as to engage the rear wheel of the bicycle when the rack-base structure is rotated to its second position to serve as a support stand for the bicycle and exercise machine apparatus.

6. The bicycle attachment device for producing a combination bicycle luggage carrier and bicycle exercise machine as described in claim 5 together with adjustable braking means acting on said rollers to control the amount of friction applied to the rear wheel of the bicycle when the bicycle and device are used as an exercise machine.

7. The bicycle attachment device for producing a combination bicycle luggage carrier and bicycle exercise machine as described in claim 5 together with:

A. left and right flap frames;

B. means for attaching said flap frames to each side of the luggage carrier platform to extend the size of the device when used as a stand for the bicycle exercise machine;

C. folding braces between said flap frames and the auxiliary pivot strap plates and positioned to secure the bicycle in upright position with respect to the bicycle stand.